United States Patent
Erk

(10) Patent No.: US 9,327,837 B2
(45) Date of Patent: May 3, 2016

(54) MODULAR AIRPLANE SEAT UNIT

(71) Applicant: Sitki Alp Erk, Ankara (TR)

(72) Inventor: Sitki Alp Erk, Ankara (TR)

( * ) Notice: Subject to any disclaimer, the term of this patent is extended or adjusted under 35 U.S.C. 154(b) by 0 days.

(21) Appl. No.: 14/355,720

(22) PCT Filed: Nov. 2, 2012

(86) PCT No.: PCT/TR2012/000190
§ 371 (c)(1),
(2) Date: May 1, 2014

(87) PCT Pub. No.: WO2013/085474
PCT Pub. Date: Jun. 13, 2013

(65) Prior Publication Data
US 2014/0312662 A1    Oct. 23, 2014

(30) Foreign Application Priority Data
Nov. 3, 2011    (TR) ................. 2011 11011

(51) Int. Cl.
*B64D 11/06*    (2006.01)
*A47B 83/02*    (2006.01)
*B60N 2/30*    (2006.01)

(52) U.S. Cl.
CPC ............... *B64D 11/06* (2013.01); *A47B 83/02* (2013.01); *B60N 2/3075* (2013.01)

(58) Field of Classification Search
CPC .................................................. B60N 2/3075
USPC ......... 297/15, 124, 125; 296/65.05, 65.09, 69
See application file for complete search history.

(56) References Cited

U.S. PATENT DOCUMENTS

| | | | |
|---|---|---|---|
| 816,899 A * | 4/1906 | Chase .............................. | 297/15 |
| 958,000 A * | 5/1910 | Peterson et al. ................ | 297/15 |
| 5,029,929 A * | 7/1991 | Sjostrom et al. ................ | 296/69 |
| 5,370,443 A * | 12/1994 | Maruyama ................. | 297/284.1 |
| 5,795,017 A * | 8/1998 | Zimmerman et al. .......... | 297/15 |
| 6,997,498 B2 * | 2/2006 | Oyama ....................... | 296/65.05 |
| 7,029,063 B2 * | 4/2006 | Holdampf ....................... | 297/15 |
| 7,452,019 B1 * | 11/2008 | Day ............................. | 296/65.16 |
| 2005/0252429 A1 | 11/2005 | Logan et al. | |

FOREIGN PATENT DOCUMENTS

| | | |
|---|---|---|
| EP | 1 480 874 B1 | 6/2006 |
| GB | 2 465 212 A | 5/2010 |
| GB | 2 465 215 A | 5/2010 |
| WO | 03074357 A1 | 9/2013 |

* cited by examiner

*Primary Examiner* — David R Dunn
*Assistant Examiner* — Tania Abraham
(74) *Attorney, Agent, or Firm* — Ladas & Parry LLP

(57) ABSTRACT

The invention is a Modular Airplane Seat Unit (1), where the seat can be lowered into the floor of a passenger cabin (9) via telescopic structure (14) and covered by sliding covers (12). The modular seat unit is to be utilized in passenger airplanes providing a more comfortable and healthy flight to the passengers, and more than one additional options like Coffee Table and Leg Rest.

2 Claims, 4 Drawing Sheets

MODULAR AIRPLANE SEAT UNIT

This application is a 371 of International Application PCT/TR2012/000190 filed 2 Nov. 2012 entitled "Modular Airplane Seat Unit", which was published in the English language on 13 Jun. 2013 with International Publication Number WO 2013/085474 A2 and which claims priority from Turkish Patent Application 2011/11011, filed 3 Nov. 2011, the content of which is incorporated herein by reference.

TECHNICAL FIELD

This invention is relates to a Modular Airplane Seat Unit that provides more than one functional option for comfortable and healthy travel of passengers.

PRIOR ART

Current airplane seats, especially in the Economy Class cabins, are organized similar to bus or other passenger vehicles' seating and provide comfort to passengers only by their back parts reclining backwards. With this, the passenger is provided, though with a limited angle, a reclined lying position. Apart from above and the material (fabric, foam, etc.) or the multimedia accessories, new different products aiming passenger's comfort providing novelties or options in the seat's mechanism are not present.

The most common passenger complaint regarding airplane seats is the narrowness of seat pitch. While this passenger complaint in the upper Economy Classes that are commonly named Business or First Class is not heard due to generous layout of seats, an effective solution has not been found in the Economy Class, yet. None of the airlines' Economy Class seat pitch is wide enough to provide comfort to its passengers. Furthermore, due to commercial reasons most of the airlines are still trying to reduce the seat pitch more to be able to carry more passengers.

The passenger complaints about narrowness of seat pitch are reduced when the cabin is completely full, because the situation is accepted as a common and inevitable problem of all passengers. But the problem arises more when the cabin is partially full. Such as; a passenger, the seat in front of whom is unoccupied, is still obliged to travel with the same seat pitch. In other words, the unoccupied seat in front of the passenger becomes only a mass narrowing his own seat pitch. It is known that most of the passengers wish the unoccupied seats in front of them were not ever there.

Passenger airplane manufacturers basically produce the body of the vehicle including the wings and the engines. Other functional components in the passenger cabin, like seats, overhead bins and multimedia systems are made by other manufacturers. When placing the purchase order, the airline notifies the manufacturer about the seating layout and the seats are placed in a fixed fashion according to this layout. For instance, a plan of 6 seats (3 seats-1 corridor-3 seats) on 25 rows in a 150 seat capacity economy cabin necessitates a calculated fixed seat pitch and installation of seats are done according to this fixed pitch.

On one hand, due to commercial reasons the airlines are aiming to carry more passengers and they are trying to reduce the seat pitch. On the other hand, due to competition they are trying to provide more comfort to their passengers. The dominating comfort criterion in the Economy Class is the seat pitch. Therefore, airlines are trying to keep the balance between making money and reducing complaints.

Airlines are satisfied to fly with full cabins. But when they fly with partially full cabins, they also observe how empty seats obstacle the passengers.

In case the airline decides to increase or reduce the number of seats, the airplane is forwarded to ground technical team and seats are rearranged and fixed according to new seating layout. This is a time consuming work and, because of the cost of this seat rearrangement and the loss of money as the airplane is suspended to fly, airlines rarely change their seating layouts.

So far, some solutions have been proposed to the above mentioned problems. One of these solutions is the rearrangement of the seats with the use of an electromechanical setup when the plane is prepared for the next flight on the ground. For instance, if a 150 seat capacity airplane landing with 150 passengers will take off next time with 90 passengers, the unused 60 seats are slid and squeezed at the back of the plane, or the unused 60 seats are removed and stored in the airport warehouse. The space generated by removing these 60 seats is distributed to the seat pitches of the 90 seats and 90 passengers fly with more comfort. But, those solutions stayed at conceptual levels and could not be actually realized as they are found to be unpractical and causing loss of time.

European Patent EP1480874B1 is related with a method for adapting the rows of seats in passenger planes according to need. Here, the rows whose positions have to be changed to achieve the actually desired layout are moved on its rails to the positions determined by the actually desired arrangement of rows.

The greatest disadvantage of these solutions is that such seat rearrangements can only be done when the plane is on the ground in between two flights and when there are no passengers inside. In such solutions, the seats are rearranged with an electromechanical setup after the new passenger distribution is known and then, the passengers are boarded. But, it is known that there are passengers either no showing or cancelling their seats or buying tickets in the last moment. Although no shows or cancellations does not cause problem in this context, airlines have to say "no" to last moment ticket buyers as their seat is no longer available. This causes commercial loss. Another drawback is the need for managed warehouses in the airports to store removed seats. Such solutions are practically rejected and not realized due to said drawbacks.

OBJECTIVE OF THE INVENTION

The objective of the invention is to create extra distance between the front and the back seat and to provide comfort to the airplane passenger by sliding forward and backward.

Another objective of the invention is to provide optional usage possibility by folding halfway and converting itself to a Coffee Table or (Leg Rest). This is due to its modular structure.

Another objective of the invention is to provide extra space to the airplane passenger by folding onto itself and hiding under the floor.

The parts comprising the Modular Airplane Seat Unit are numbered one by one and the names of the parts are listed below:

1. Modular Airplane Seat Unit
2. Back Part of the Seat
2.1 Upper Part
2.2 Lower Part
3. Seat Folding Points
4. Base of Seat Storage Chamber
5. Rail
6. Location Determining Pins
7. Servo Motors
7.1. Servo Motor (Back)
7.2. Servo Motor (Forward)
7.3. Servo Motor (Backward)
7.4. Servo Motor (Bottom)
8. Sensors
9. Floor of the Passenger Cabin
11. Buttons
12. Sliding Covers
13. Coffee Table (or Leg Rest)
14. Staged Mechanism
15. Mat of the Seat
17. Armrest

DISCLOSURE OF THE INVENTION

The invention is a Modular Airplane Seat Unit (1) designed to provide a comfortable flight to the passenger by sliding forward and backward, by half folding and converting to a Coffee Table or (Leg Rest) and by full folding and hiding under the Floor of the Passenger Cabin (9).

Figure 1:
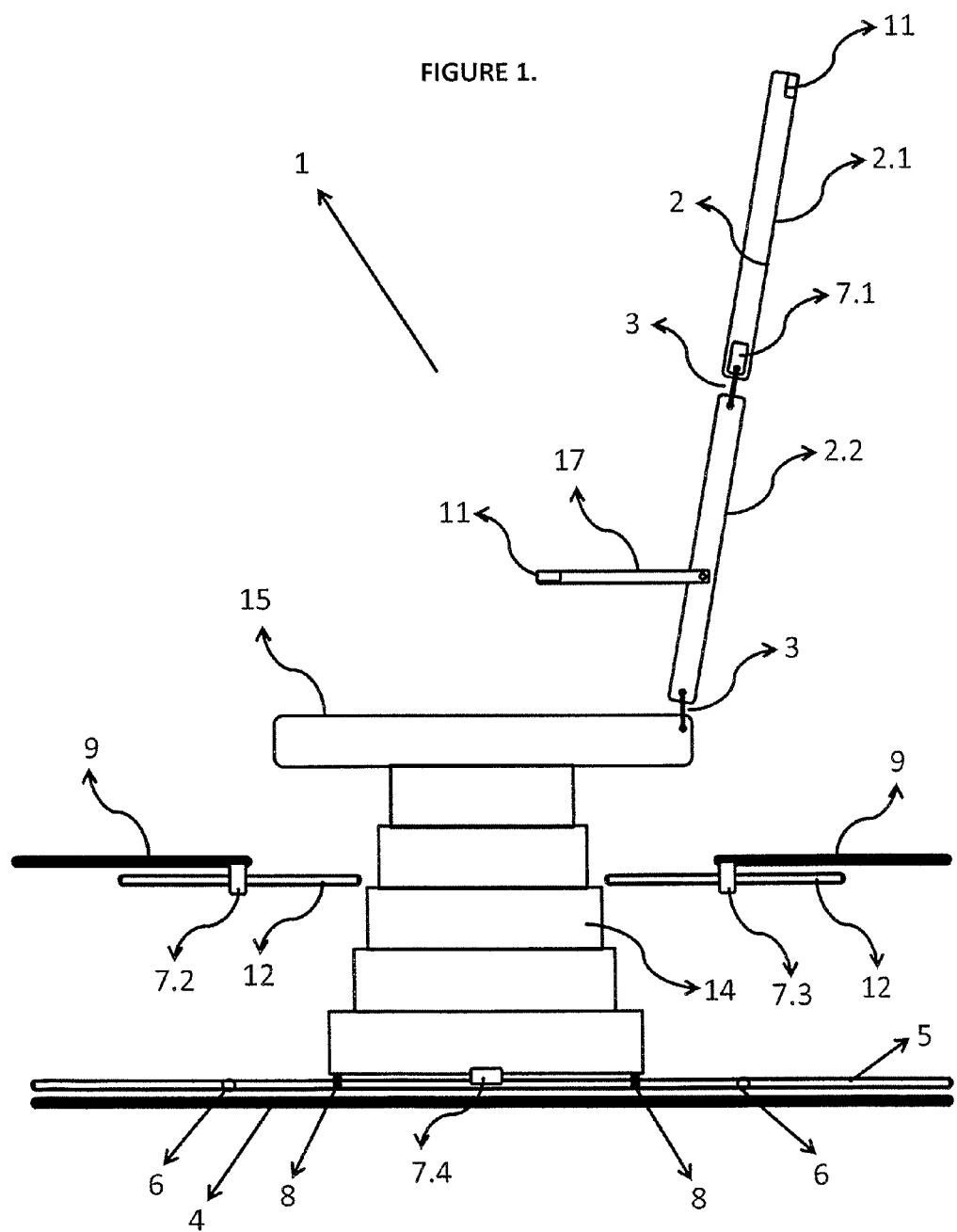
FIG. 1, is the side view of the Modular Airplane Seat Unit.
Figure 2:
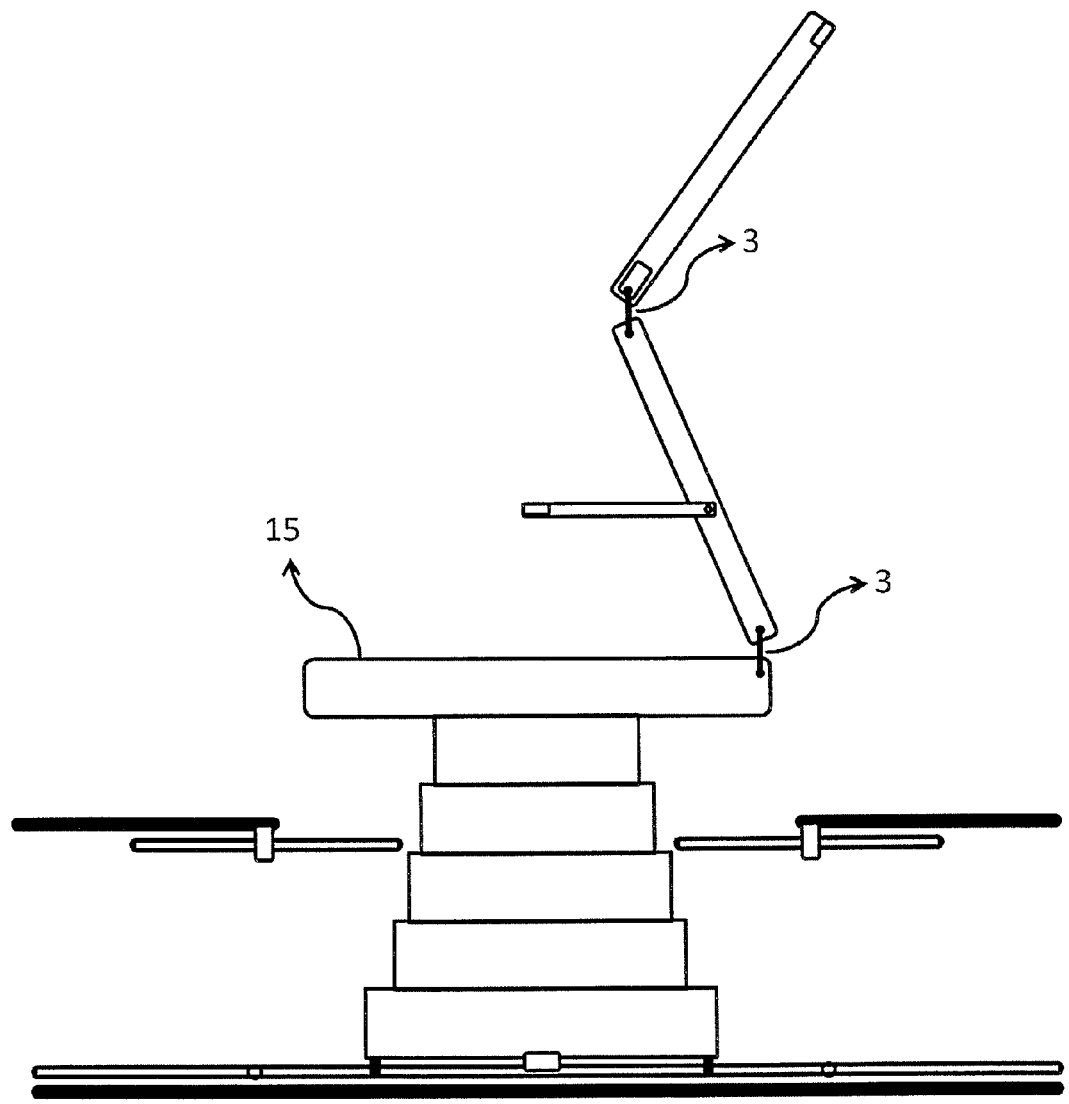
FIG. 2, is the side view of the Modular Airplane Seat Unit when folding.
Figure 3:
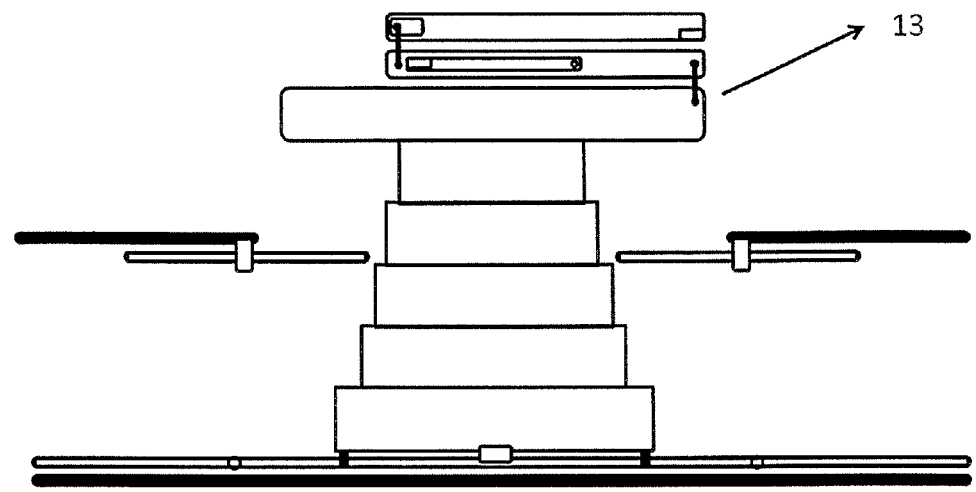
FIG. 3, is a side view of the Coffee Table (or Leg Rest) mode of the Modular Airplane Seat Unit.
Figure 4:
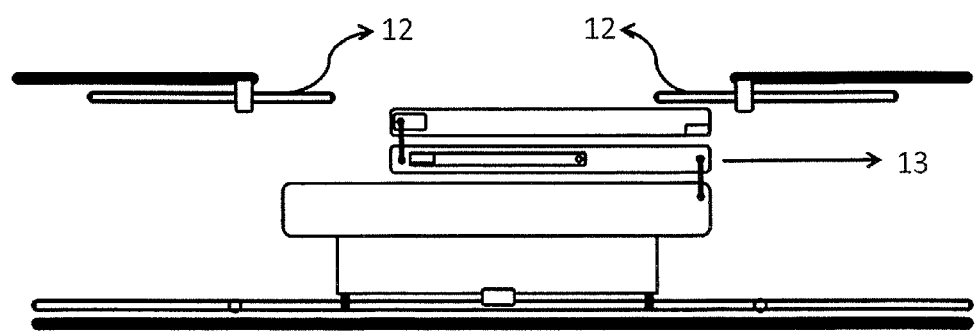
FIG. 4, is a side view of the Modular Airplane Seat Unit folded onto itself and hidden under the floor. Here the sliding covers are open, yet.
Figure 5:
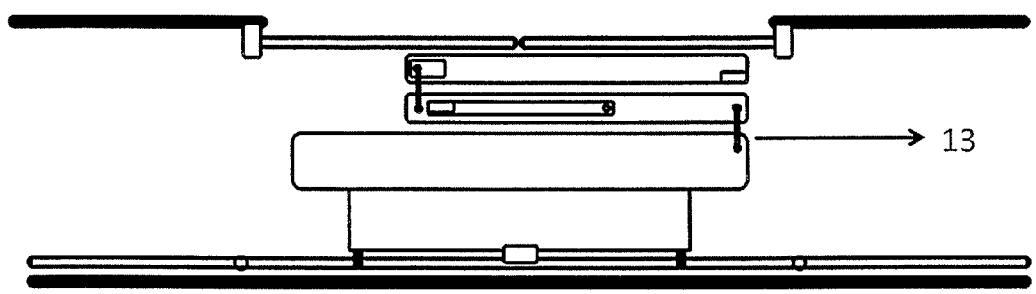
FIG. 5, is a side view of the closed position of sliding covers when Modular Airplane Seat Unit is folded onto itself and hidden under the floor.

As shown in detail in FIG. 1, the Modular Airplane Seat Unit (1) is characterized by Back Part of the Seat (2) composed of two parts as Upper (2.1) and Lower (2.2) parts, the Seat Folding Point (3) between Upper Part (2.1) and Lower Part (2.2) of the Back Part of the Seat (2), Mat of the Seat (15), Staged Mechanism (14) providing upwards or downwards movement by its telescopic structure, a Rail (5) continuous along the way of the cabin located under the Staged Mechanism (14) and on the Base of Seat Storage Chamber (4), two Sensors (8) at the bottom of the seat, one in the front one at the rear, coinciding with the Rail (5), Location Determining Pins (6) one in front of the front Sensor (8) and one at the back of the rear Sensor (8), Sliding Covers (12) closing and opening by moving towards or away from each other, leveled with the Floor of the Passenger Cabin (9) and coinciding with the bottom of the seat, two Servo Motors, Forward (7.2) and Backward (7.3) on the Sliding Covers (12), one Servo Motor (back) (7.1) on the Upper Part (2.1) of the Back Part of the Seat (2), one Servo Motor (bottom) (7.4) located on the Rail (5) and Buttons (11) placed on the upper corner of the Upper Part (2.1) of the Back Part of the Seat (2) and on the Armrest (17) of the Modular Airplane Seat Unit (1).

The Modular Airplane Seat Unit (1) can move forward or backward independent from other seats of the airplane and even during the flight which enables the change of seat pitches anytime. The seat is installed on its base on the right and the left on the Rail (5) which is located continuous along the way of the cabin. The base of the seat has circular gears on both sides which matches the linear gears of the Rail (5). The circular gears can rotate with the help of a Servo Motor (7.4) located under the seat. This circular movement provides the forward and backward movement of the seat. This Servo Motor (7.4) is controlled by electric Buttons (11) located on the Armrest (17) of the seat and the back of the Back Part of the Seat (2). One for forward movement, one for backward movement there are two Buttons (11). The passenger presses and holds the button of the direction he wants to move the seat. The seat stops as the button is released.

The maximum points the Modular Airplane Seat Unit (1) can move forward or backward are determined by the Location Determining Pins (6) placed on the Rail (5). The Sensors (8) in the front or at the back sense the Pins (6) in the front or at the back and stop the seat by turning off the power of the Servo Motor (7.4) by disabling the Buttons (11) when the seat reaches the far most forward or far most backward positions.

In practice, the seated passenger can increase his seat pitch by moving his own seat backwards and in parallel by moving the seat in front of him forwards. But, in order not to disturb other passengers, if the seat at the back is occupied, then the passenger is not allowed to move his own seat backwards, and if the seat in front of him is occupied, then the passenger is again not allowed to move the seat in front of him forwards.

The invention, Modular Airplane Seat Unit (1) can fully fold and hide under the Floor of the Passenger Cabin (9) by first Upper (2.1) and Lower (2.2) two parts of the Back Part of the Seat (2) folding at the Seat Folding Points (3) and then coming on top of the Mat of the Seat (15). Thus, the Back of the Seat (2) converts to an invisible position (Drawing 3.) and the seat takes the mode of a Coffee Table (or Leg Rest). This mode of the seat is actually the most compact situation of the seat before hiding under the floor, easing this hiding action. The seat in this mode serves as a Coffee Table (13) for the passenger at the back or for the passenger on the side, or serves as a Leg Rest for the passenger at the back. The folding movement of the Back of the Seat (2) composed of two parts is provided by the Servo Motor (7.1) which is controlled by the electric Buttons (11). This servo motor is shown as Servo Motor (back) (7.1) on the drawings. There is a Button (11) which controls to bring the seat to the Coffee Table (or Leg Rest) (3) mode at whichever mode the seat is. For the seat to be able to be brought to Coffee Table (or Leg Rest) mode by the passengers at the back or on the side of the seat, the Buttons (11) are repeated at the back and on the Armrest (17) of the seat. The Buttons (11) can operate when the seat is empty, that is when no one is seated. There are sensors on the Mat (15) of the seat sensing the presence of a seated passenger disabling the buttons (11) and folding of the seat. After the seat converts to a Coffee Table (or Leg Rest), both of the two sliding covers (12) open with the help of two Servo Motors (Forward and Backward) (7.2 and 7.3). After the covers open, the last process of lowering movement of seat towards the base is realized.

Upon the request of the passenger, the Modular Airplane Seat Unit (1), the invention, can fold totally and hide under the Floor of the Passenger Cabin (9) compacted on the Base of the Seat Storage Chamber (4). In practice it is as if the seat has disappeared. Before the seat hides under the Floor of the Passenger Cabin (9), it first converts to a Coffee Table (or Leg Rest) stated above as the second specialty and then lowers down under the Floor of the Passenger Cabin (9). It was stated above that the seat was in its most compact mode when it is folded and is in its Coffee Table (or Leg Rest) mode. The seat starts to lower down when it is in its above mentioned Coffee Table (or Leg Rest) mode with the help of a Staged Mechanism (14) and stops when it reaches the base of the Seat Storage Chamber (4). The Sliding Covers (12) on the Floor of the Passenger Cabin (9) slide towards each other, join and close. By this, the seat is covered and totally hidden under the Floor of the Passenger Cabin (9) and inside the Seat Storage Chamber (4). The Sliding Covers, when closed can be stepped over like the other parts of the Floor of the Passenger Cabin (9). The Sliding Covers close and open with the help of two Servo Motors (Forward and Backward) (7.2 and 7.3).

The hiding movement of the seat is controlled by the electric Buttons (11). There is a Button (11) which controls to hide the seat at whichever mode the seat is. For the seat to be able to be hidden by the passengers at the back or on the side of the seat, the Buttons (11) are repeated at the back and on the Armrest (17) of the seat. The Buttons (11) can operate when the seat is empty, that is when no one is seated. There are sensors on the Mat (15) of the seat sensing the presence of a seated passenger disabling the buttons (11) and hiding of the seat.

The Buttons (11) on the Armrest (17) of the seat and the Buttons (11) at the back of the seat are designed to be used by the passenger himself and the passenger sitting at the back seat, respectively. The functions and operability of the buttons are listed below.

MOVE SEAT FORWARD Button:

When pressed, the seat continues to move forward and when released, the seat stops. The button which are on the Armrest (17) of the seat by which the passenger controls his own seat are operable always when the seat is full (own passenger seated) or when the seat is empty (own passenger not seated). The button at the back of the front seat by which the passenger at the back controls the front seat is operable only when the front seat is empty (front passenger not seated). It is not operable when the seat is full (front passenger seated.)

MOVE SEAT BACKWARD Button:

When pressed, the seat continues to move backward and when released, the seat stops. The button which is on the Armrest (17) of the seat by which the passenger controls his own seat are operable always when the seat is full (own passenger seated) or when the seat is empty (own passenger not seated). The button at the back of the front seat by which the passenger at the back controls the front seat is operable only when the front seat is empty (front passenger not seated). It is not operable when the seat is full (front passenger seated.)

CONVERT TO COFFEE TABLE (or LEG REST) Button:

When pressed once, the seat continues to move until it converts to a Coffee Table (or Leg Rest) from whichever mode it is and stops by itself. The button which is on the Armrest (17) of the seat and at the back of the seat are operable only when the seat is empty (own passenger not seated). It is not operable when the seat is full (own passenger seated.)

HIDE SEAT Button:

When pressed once, the seat continues to move until it hides under the floor of the passenger cabin from whichever mode it is and stops by itself. The button which is on the Armrest (17) of the seat and at the back of the seat are operable only when the seat is empty (own passenger not seated). It is not operable when the seat is full (own passenger seated.)

CONVERT TO SEAT Button:

When pressed once, the seat continues to move until it converts to its original seat mode from whichever mode it is and stops by itself. As this button will be inaccessible when the seat is in its hidden mode, this button is duplicated on the over head near stewardess call or reading light buttons. As the seat is either hidden under or is in Coffee Table (or Leg Rest) mode, thus passenger cannot be seated on. Therefore the buttons are operable always.

EMERGENCY STOP Button:

This button is used to stop the seat in emergency when the seat is moving for any reason. This button is on the Armrest (17) and at the back of the seat and is operable always with priority.

As all the seats in the cabin move independent of each other, the options of moving forward and backward, converting to Coffee Table (or Leg Rest) and hiding under the floor can be done anytime during the flight and passengers are on board. Additionally, the seats can be moved from a control panel by the stewardess one by one or in group.

Naturally, a passenger cabin furnished with the Modular Airplane Seat Units (1), the invention, will be in a disordered and messy situation after the flight as some seats will be in their forward positions, some backward, some will be Coffee Tables (or Leg Rests) and some will be hidden. The stewardesses will be able to bring all the seats to their original seat positions from a control panel with a single touch on a button.

The invention claimed is:

1. A system comprising an airplane cabin and a modular airplane seat unit, the modular airplane seat unit comprising
    (a) a seatback comprising an upper seatback portion and a lower seatback portion;
    (b) a seat bottom; and
    (c) a telescopic base disposed under the seat bottom and supporting the seat bottom, the telescopic base comprising a bottommost base unit and a plurality of collapsible base units;
wherein the upper seatback portion is pivotally connected to the lower seatback portion and the lower seatback portion is pivotally connected to the seat bottom such that the upper seatback portion, lower seatback portion and seat bottom are configurable in a plurality of configurations, including a first configuration with the seatback disposed transverse to the seat bottom with the upper and lower seatback portions in alignment with one another, and a second configuration with the lower seatback portion folded atop the seat bottom and the upper seatback portion folded atop the lower seatback portion and with the seat bottom, lower seatback portion and upper seatback portion disposed in respective horizontal planes; and wherein the bottommost base unit and the plurality of collapsible base units of the telescopic base are configurable in a plurality of configurations including an extended configuration with each of the plurality of collapsible base units extending above the bottommost base unit a different distance, and a collapsed configuration with each of the plurality of collapsible base units collapsed and disposed within the bottommost base unit, wherein the airplane cabin comprises a floor with a storage space underneath the floor in which the modular airplane seat unit fits with the upper seatback portion, lower seatback portion and seat bottom in the second configuration and with the bottommost base unit and the plurality of collapsible base units in the collapsed configuration, and wherein the airplane cabin comprises a sliding cover that is movable between a closed position wherein the sliding cover covers an opening to the storage space in the floor and an open position wherein the sliding cover does not cover the opening such that the modular airplane seat unit can be fitted into the storage space with the upper seatback portion, lower seatback portion and seat bottom in the second configuration and with the bottommost base unit and the plurality of collapsible base units in the collapsed configuration.

2. The system according to claim 1, comprising a rail on which the bottommost base unit of the telescopic base is disposed.

* * * * *